US009256555B2

(12) United States Patent
Manula et al.

(10) Patent No.: US 9,256,555 B2
(45) Date of Patent: Feb. 9, 2016

(54) METHOD AND SYSTEM FOR QUEUE DESCRIPTOR CACHE MANAGEMENT FOR A HOST CHANNEL ADAPTER

(71) Applicant: Oracle International Corporation, Redwood City, CA (US)

(72) Inventors: Brian Edward Manula, Oslo (NO); Haakon Ording Bugge, Oslo (NO); Frederick Luther Gotwald, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 521 days.

(21) Appl. No.: 13/721,699

(22) Filed: Dec. 20, 2012

(65) Prior Publication Data

US 2014/0181409 A1 Jun. 26, 2014

(51) Int. Cl.
*G06F 12/00* (2006.01)
*G06F 13/12* (2006.01)
*G06F 12/12* (2006.01)
*G06F 13/16* (2006.01)

(52) U.S. Cl.
CPC .............. *G06F 13/12* (2013.01); *G06F 12/123* (2013.01); *G06F 13/1642* (2013.01)

(58) Field of Classification Search
CPC ................ G06F 12/12–12/123; G06F 13/1642
USPC .......................................................... 711/113
See application file for complete search history.

(56) References Cited

U.S. PATENT DOCUMENTS

| 5,592,432 | A | * | 1/1997 | Vishlitzky | ........... G06F 11/3419 365/230.03 |
| 5,751,993 | A | * | 5/1998 | Ofek | ...................... G06F 12/121 710/54 |
| 6,122,289 | A | * | 9/2000 | Brown et al. | .................. 370/465 |
| 6,459,698 | B1 | | 10/2002 | Acharya | |
| 6,563,790 | B1 | | 5/2003 | Yu et al. | |
| 6,741,559 | B1 | | 5/2004 | Smeulders et al. | |
| 6,789,143 | B2 | | 9/2004 | Craddock et al. | |
| 6,917,987 | B2 | | 7/2005 | Parthasarathy et al. | |
| 7,136,353 | B2 | | 11/2006 | Ha et al. | |
| 7,330,918 | B2 | | 2/2008 | Yamamoto et al. | |
| 7,496,698 | B2 | | 2/2009 | Biran et al. | |
| 7,496,699 | B2 | * | 2/2009 | Pope | ........................ G06F 13/28 710/22 |
| 7,609,636 | B1 | | 10/2009 | Mott | |
| 7,668,177 | B1 | * | 2/2010 | Trapp et al. | ............... 370/395.42 |
| 7,742,497 | B2 | | 6/2010 | Ganti et al. | |
| 7,769,015 | B2 | | 8/2010 | Huang et al. | |
| 7,782,805 | B1 | | 8/2010 | Belhadj et al. | |
| 7,787,366 | B2 | | 8/2010 | Cuffaro et al. | |

(Continued)

*Primary Examiner* — Prasith Thammavong
(74) *Attorney, Agent, or Firm* — Osha Liang LLP

(57) ABSTRACT

A method for managing a queue descriptor cache of a host channel adaptor (HCA) includes obtaining a queue descriptor from memory. The queue descriptor includes data describing a queue and the memory is located in a host system. The method further includes storing a copy of the queue descriptor in the queue descriptor cache of the HCA. The HCA accesses the copy of the queue descriptor to obtain the plurality of data, accesses the queue using the data, and updates the data to reflect the access to the queue. The method further includes calculating, using the data, a value corresponding to utilization of the queue, comparing the value against a threshold, fetching, if the value exceeds the threshold, a new copy of the queue descriptor from memory, and replacing the copy of the queue descriptor in the queue descriptor cache with the new copy obtained from the memory.

20 Claims, 7 Drawing Sheets

(56) References Cited

U.S. PATENT DOCUMENTS

| | | |
|---|---|---|
| 7,817,634 B2 | 10/2010 | Coffman et al. |
| 7,830,919 B1 | 11/2010 | Thompson |
| 7,899,050 B2 | 3/2011 | Craddock et al. |
| 8,244,946 B2 | 8/2012 | Gupta et al. |
| 8,255,475 B2 | 8/2012 | Kagan et al. |
| 8,259,576 B2 | 9/2012 | Lee et al. |
| 8,259,746 B2 | 9/2012 | Lo et al. |
| 8,274,976 B2 | 9/2012 | Aloni et al. |
| 8,296,386 B1 | 10/2012 | Micalizzi, Jr. |
| 2001/0036185 A1 | 11/2001 | Dempo |
| 2003/0101158 A1 | 5/2003 | Pinto et al. |
| 2005/0018669 A1 | 1/2005 | Arndt et al. |
| 2005/0060443 A1 | 3/2005 | Rosner |
| 2005/0135419 A1 | 6/2005 | Pullen et al. |
| 2005/0223118 A1 | 10/2005 | Tucker et al. |
| 2007/0008886 A1 | 1/2007 | Chen et al. |
| 2007/0019665 A1 | 1/2007 | Benveniste |
| 2007/0165672 A1 | 7/2007 | Keels et al. |
| 2007/0223472 A1 | 9/2007 | Tachibana et al. |
| 2007/0223483 A1 | 9/2007 | Huang et al. |
| 2007/0242686 A1 | 10/2007 | Zegers et al. |
| 2008/0140984 A1 | 6/2008 | Shearer |
| 2008/0168194 A1 | 7/2008 | Gregg et al. |
| 2009/0125604 A1 | 5/2009 | Chang et al. |
| 2011/0142064 A1* | 6/2011 | Dubal et al. ............ 370/412 |
| 2011/0216648 A1 | 9/2011 | Mehrotra et al. |
| 2012/0239832 A1 | 9/2012 | Subramanian et al. |

* cited by examiner

METHOD AND SYSTEM FOR QUEUE DESCRIPTOR CACHE MANAGEMENT FOR A HOST CHANNEL ADAPTER

BACKGROUND

The Infiniband® network includes nodes that communicate through a channel-based switched fabric (Infiniband® is a registered trademark of Infiniband Trade Association, located in Beaverton, Oreg.). For example, the nodes may be a host, an input/output subsystem, or a router which connects to another network. The switched fabric is made of a collection of switches, routers, and/OR links that connect a set of channel adapters. The channel adapters form an interface between the switched fabric and the nodes. The channel adapter of the host is referred to as a host channel adapter. The channel adapter of an I/O subsystem is referred to as a target channel adapter.

In Infiniband®, data packets are sent and received using queues. The data packets are stored in entries. Completion queues are used to buffer data packets produced by the host until the host channel adapter can send them. Receive queues are used to buffer data packets received by the host channel adapter until the host can consume them. Information about a queue is stored in a data structure called a queue descriptor. The host channel adapter accesses entries in queues based on the information stored in the queue descriptors.

SUMMARY

In general, in one aspect, embodiments relate to a method for managing a queue descriptor cache of a host channel adaptor (HCA). The method includes obtaining a queue descriptor from memory. The queue descriptor includes data describing a queue and the memory is located in a host system. The method further includes storing a copy of the queue descriptor in the queue descriptor cache of the HCA. The HCA accesses the copy of the queue descriptor to obtain the plurality of data, accesses the queue using the data, and updates the data to reflect the access to the queue. The method further includes calculating, using the data, a value corresponding to utilization of the queue, comparing the value against a threshold, fetching, if the value exceeds the threshold, a new copy of the queue descriptor from memory, and replacing the copy of the queue descriptor in the queue descriptor cache with the new copy obtained from the memory.

In general, in one aspect, embodiments relate to a host channel adaptor (HCA). The host channel adapter includes a descriptor fetch module that includes a queue descriptor cache, configured to store a copy of a queue descriptor including data describing a queue. The queue descriptor is located in a memory of a host operatively connected to the HCA. The queue is located in the memory and includes entries. The descriptor fetch module further includes a cache control module, configured to obtain the copy of the queue descriptor from the memory, store the copy of the queue descriptor in the cache, determine that the HCA has accessed the queue, calculate a value representing a utilization of the queue, compare the value against a threshold, and fetch a new copy of the queue descriptor from memory when the value exceeds the threshold. The HCA further includes additional modules, configured to access the copy of the queue descriptor to obtain the data, access the queue using the data, and update the data to reflect the access to the queue.

In general, in one aspect, embodiments relate to a system that includes a host and a host channel adapter (HCA). The host includes a processor, and a memory configured to store a queue including multiple entries and a queue descriptor that includes data describing a queue. The data includes a hardware pointer configured to reference an entry in the queue most recently access by the HCA, a software pointer configured to reference an entry in the queue most recently accessed by a host, and a threshold. The HCA is operatively connected to the host and includes a cache configured to store a copy of the queue descriptor, and a cache control module, configured to obtain the copy of the queue descriptor from the memory, store the copy of the queue descriptor in the cache, determine that the HCA has accessed the queue, calculate a value representing the number of entries separating the software pointer and the hardware pointer, compare the value against the threshold, and fetch a new copy of the queue descriptor from the memory when the value exceeds the threshold. The HCA further includes additional modules configured to access the copy of the queue descriptor to obtain the data, access the queue using the data, and update the data to reflect the access to the queue.

Other aspects of the invention will be apparent from the following description and the appended claims.

DETAILED DESCRIPTION

Figure 1:
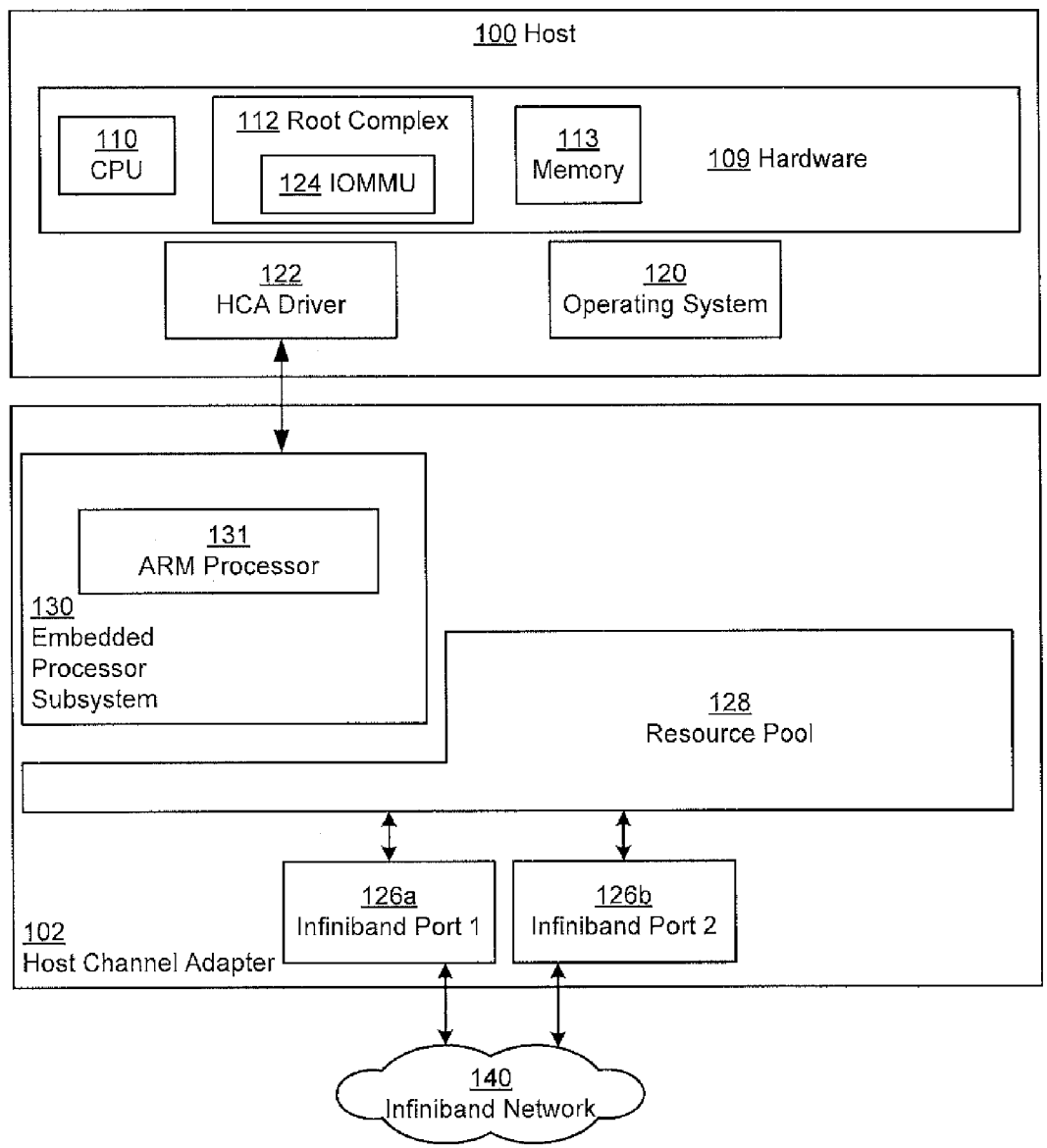
FIGS. 1-3 show schematic diagrams in one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention are directed to a method and system for managing a cached queue descriptor on the host channel adapter (HCA). Specifically, embodiments of the invention specify a threshold for the cached queue descriptor. When the utilization of a queue corresponds to the queue descriptor exceeds a threshold, a new copy of the queue descriptor is obtained by the HCA from memory on the host. By selecting an optimal threshold and pre-fetching a new copy of the queue descriptor based on the threshold, embodiments allow various modules to continue using the queue descriptor while minimizing the number of requests for a new queue descriptor.

FIG. 1 shows a schematic diagram of a host system in one or more embodiments of the invention. In one or more embodiments of the invention, the host system is any physical computing device. Specifically, the host system includes at least a minimum amount of hardware necessary to process instructions to perform one embodiment of the invention. As shown in FIG. 1, the host system includes a host (100) and an HCA (102) in one or more embodiments of the invention. These components are discussed below.

In one or more embodiments of the invention, the host (100) includes an HCA driver (122), and operating system (120), and a root complex (112). In one or more embodiments of the invention, the HCA driver (122) is software that provides an interface to the HCA (102) for the operating system (120). Specifically, when the operating system (120), on its own behalf or on behalf of an application, wants to send work requests to the HCA (102), the operating system (120) invokes a routine in the HCA driver (122).

Continuing with the host, the host (100) includes hardware (109). The hardware (109) may include, for example, a central processing unit (CPU) (110), memory (113), and a root complex (112). In one or more embodiments of the invention, the CPU (110) is a hardware processor component for processing instructions of the host. The CPU (110) may include multiple hardware processors. Alternatively or additionally, each hardware processor may include multiple processing cores. In general, the CPU (110) is any device configured to execute instructions on the host (100).

In one or more embodiments of the invention, the memory (113) is any type of hardware device for storage of data. In one or more embodiments of the invention, the memory (113) may be partitioned. In one or more embodiments of the invention, the memory (113) includes functionality to store one or more queues (not shown) and one or more queue descriptors (not shown). The queue(s) and queue descriptor(s) are discussed below and in FIG. 3.

In one or more embodiments of the invention, the root complex (112) includes functionality to connect the CPU and memory subsystem to a peripheral component interconnect (PCI) Express switch fabric. Specifically, in one or more embodiments of the invention, the root complex (112) connects the host (100) to the HCA (102). Although FIG. 1 shows the root complex (112) as separate from the CPU (110), the root complex (112) may be integrated as part of the CPU.

The root complex (112) includes an input/output memory management unit (IOMMU) (124) in one or more embodiments of the invention. The IOMMU (124) includes functionality to connect a direct memory access (DMA) input/output (I/O) bus to the memory. In one or more embodiments of the invention, the IOMMU (124) includes functionality to translate addresses from one level of abstraction to another.

Continuing with FIG. 1, the host (100) is connected to the HCA (102). In one or more embodiments of the invention, the connection between the host (100) and the HCA (102) may be a PCI express connection. Specifically, the HCA may connect to a PCI express fabric connector on the host.

In one or more embodiments of the invention, the HCA (102) is a hardware device configured to connect the host (100) to the Infiniband® network (140). Specifically, the HCA (102) includes functionality to receive work requests from the host (100) and process the work requests. Processing the work requests may include performing DMA with host memory to obtain and store packet data and to obtain control information, performing any validation required on the packet data, generating packets from the packet data, and sending and receiving packets on the Infiniband® network (140). FIG. 1 shows a schematic diagram of the HCA (102) from the prospective of the host (100). As shown in FIG. 1, the HCA (102) includes at least one Infiniband® port (e.g., Infiniband® port 1 (126a), Infiniband® port 2 (126b)), a resource pool (128), and an embedded processor subsystem (130). Each of the components of the HCA is discussed below.

In one or more embodiments of the invention, an Infiniband® port (e.g., Infiniband® port 1 (126a), Infiniband® port 2 (126b)) is a physical interface connector between the HCA (102) and the Infiniband® network (140). Although FIG. 1 shows two Infiniband® ports, a different number of ports may exist without departing from the invention.

The resource pool (128) is a collection of resources that are required to send and receive packets on the Infiniband® network. Specifically, the resource pool (128) corresponds to the collection of hardware and stored data that is accessible by the host (100) and may be shared among virtual machines on the host (100). The resource pool (128) is discussed in FIG. 2 below.

The embedded processor subsystem (130) corresponds to processing logic for executing instructions on the HCA (102). In one or more embodiments of the invention, the embedded processor subsystem includes an embedded processor that includes functionality to execute software or firmware.

Figure 2:
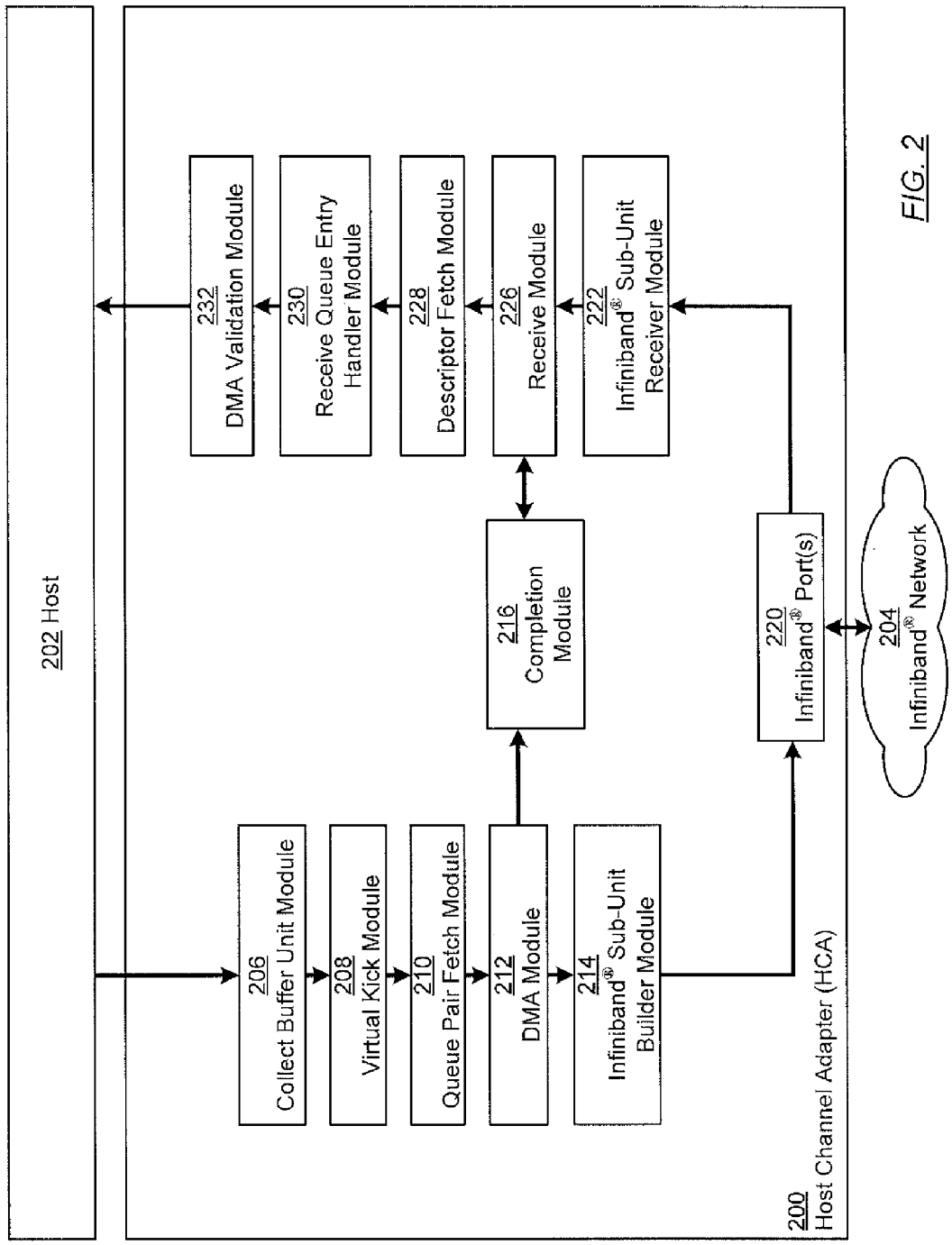

FIG. 2 shows a schematic diagram of a HCA (200) connecting a host (202) to an Infiniband® network (204) in one or more embodiments of the invention. The host (202), Infiniband® network (204), and Infiniband® port(s) (220) may be the same as or substantially the same as like named components of FIG. 1.

As shown in FIG. 2, the HCA (200) may include multiple modules. Each module includes functionality to perform a task for processing a work request. The multiple modules may include one or more of a collect buffer unit module (206), a receive queue scheduler (RQS) module (210), a direct memory access (DMA) module (212), an Infiniband® packet builder module (214), one or more Infiniband® ports (220), a completion module (216), an Infiniband® packet receiver module (222), a receive module (226), a descriptor fetch module (228), a receive queue entry handler module (230), and a DMA validation module (232). The respective modules correspond to both transmitting processing logic for sending messages on the Infiniband® network (204) and receiving processing logic for receiving messages from the Infiniband® network (204). In one or more embodiments of the invention, the collect buffer unit module (206), RQS module (210), direct memory access (DMA) module (212), Infiniband® packet builder module (214), and completion module (216) may be components of the transmitting processing logic. The remaining modules and the completion module (216) may correspond to receiving processing logic.

In one or more embodiments of the invention, each module may correspond to hardware and/or firmware. Each module is configured to process data units. Each data unit corresponds to a command or a received message or packet. For example, a data unit may be the command, an address of a location on the communication adapter storing the command, a portion of a message corresponding to the command, a packet, an identifier of a packet, or any other identifier corresponding to a command, a portion of a command, a message, or a portion of a message. A command or received message may be considered a work request.

The dark arrows between modules show the transmission path of data units between modules as part of processing work requests and received messages in one or more embodiments of the invention. Data units may have other transmission paths (not shown) without departing from the invention. Further, other communication channels and/or additional components of the HCA (200) may exist without departing from the invention. Each of the components of the resource pool is discussed below.

The collect buffer controller module (206) includes functionality to receive work request data from the host and store the work request data on the HCA. Specifically, the collect buffer controller module (206) is connected to the host and configured to receive the work request from the host and store the work request in a buffer. When the work request is received, the collect buffer controller module is configured to issue a kick that indicates that the work request is received.

In one or more embodiments of the invention, the RQS module (210) includes functionality to load balance work requests received from applications and to obtain queue pair (QP) state information for the QP corresponding to the data unit.

QPs define communication channels between the applications. More specifically, per the Infiniband® protocol, the message has a corresponding send queue and corresponding a receive queue. An application uses the send queue to send messages and the receive queue to receive messages. The send queue and receive queue on the same host that is used by the application to communicate with another application form a QP. Each QP may have a corresponding QP with which to communicate. For example, consider the scenario where application M is communicating with application N. In such a scenario, application M may have QP M, with send queue M and receive queue M, and application N may have QP N, with send queue N and receive queue N. Messages from application M to application N are sent from send queue M to receive queue N. Messages from application N to application M are sent from send queue N to receive queue M. Logic and data structures used by the host system specify which QP on the recipient to use to send messages. Thus, by an application specifying the QP, the application is identifying the target application to receive the message.

Continuing with FIG. 2, in one or more embodiments of the invention, the DMA module (212) includes functionality to perform DMA with host memory. The DMA module may include functionality to determine whether a work request in a data unit or referenced by a data unit identifies a location in host memory that includes payload. The DMA module may further include functionality to validate that the process sending the work request has necessary permissions to access the location, obtain the payload from the host memory, and store the payload in the DMA memory. Specifically, the DMA memory corresponds to a storage unit for storing a payload obtained using DMA.

Continuing with FIG. 2, in one or more embodiments of the invention, the DMA module (212) is connected to an Infiniband® packet builder module (214). In one or more embodiments of the invention, the Infiniband® packet builder module includes functionality to generate one or more packets for each data unit and to initiate transmission of the one or more packets on the Infiniband® network (204) via the Infiniband® port(s) (220). In one or more embodiments of the invention, the Infiniband® packet builder module may include functionality to obtain the payload from a buffer corresponding to the data unit, from the host memory, and from an embedded processor subsystem memory.

In one or more embodiments of the invention, the completion module (216) includes functionality to generate completions for work requests. For example, the completion module may include functionality to manage packets for queue pairs (QPs) set in reliable transmission mode. Specifically, in one or more embodiments of the invention, when a QP is in a reliable transmission mode, then the receiving channel adapter of a new packet responds to the new packet with an acknowledgement message indicating that transmission completed or an error message indicating that transmission failed. The completion module (216) includes functionality to manage data units corresponding to packets until an acknowledgement is received or transmission is deemed to have failed (e.g., by a timeout).

In one or more embodiments of the invention, the Infiniband® packet receiver module (222) includes functionality to receive packets from the Infiniband® port(s) (220). In one or more embodiments of the invention, the Infiniband® packet receiver module (222) includes functionality to perform a checksum to verify that the packet is correct, parse the headers of the received packets, and place the payload of the packet in memory. In one or more embodiments of the invention, the Infiniband® packet receiver module (222) includes functionality to obtain the QP state for each packet from a QP state cache. In one or more embodiments of the invention, the Infiniband® packet receiver module includes functionality to transmit a data unit for each packet to the receive module (226) for further processing.

In one or more embodiments of the invention, the receive module (226) includes functionality to validate the QP state obtained for the packet. The receive module (226) includes functionality to determine whether the packet should be accepted for processing. In one or more embodiments of the invention, if the packet corresponds to an acknowledgement or an error message for a packet sent by the HCA (200), the receive module includes functionality to update the completion module (216).

Additionally or alternatively, the receive module (226) includes a queue that includes functionality to store data units waiting for one or more reference(s) to buffer location(s) or waiting for transmission to a next module. Specifically, when a process in a virtual machine is waiting for data associated with a QP, the process may create receive queue entries that reference one or more buffer locations in host memory in one or more embodiments of the invention. For each data unit in the receive module, the receive module includes functionality to identify the receive queue entries from a HCA cache or from host memory, and associate the identifiers of the receive queue entries with the data unit.

In one or more embodiments of the invention, the descriptor fetch module (228) includes functionality to obtain descriptors for processing a data unit. For example, the descriptor fetch module may include functionality to obtain descriptors for a receive queue, a shared receive queue, a ring buffer, and the completion queue.

In one or more embodiments of the invention, the receive queue entry handler module (230) includes functionality to obtain the contents of the receive queue entries. In one or more embodiments of the invention, the receive queue entry handler module (230) includes functionality to identify the location of the receive queue entry corresponding to the data unit and obtain the buffer references in the receive queue entry. In one or more embodiments of the invention, the receive queue entry may be located on a cache of the HCA (200) or in host memory.

In one or more embodiments of the invention, the DMA validation module (232) includes functionality to perform DMA validation and initiate DMA between the HCA and the host memory. The DMA validation module includes functionality to confirm that the remote process that sent the packet has permission to write to the buffer(s) referenced by the buffer references, and confirm that the address and the size of the buffer(s) match the address and size of the memory region referenced in the packet. Further, in one or more embodiments of the invention, the DMA validation module (232) includes functionality to initiate DMA with host memory when the DMA is validated.

Figure 3:
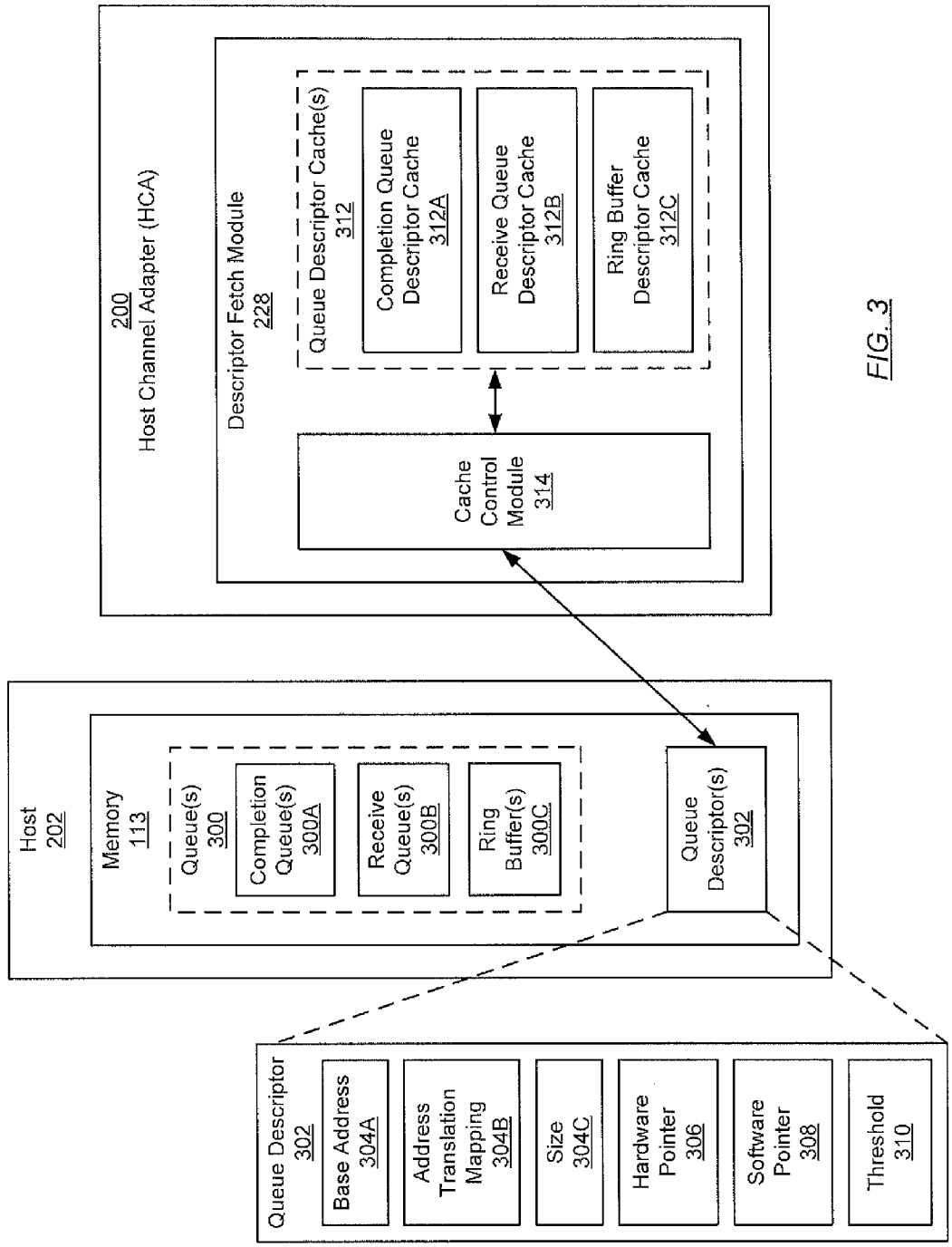

FIG. 3 shows a schematic diagram of the descriptor fetch module (228) and host memory (113) in accordance with one embodiment of the invention. As shown in FIG. 3, the host memory includes one or more queue(s) (300) and at least one queue descriptor (302). The queues(s) (300) and queue descriptor(s) (302) are discussed below.

In one or more embodiments of the invention, a queue (300) is a data structure used by the HCA (200) to buffer data transmitted between the host (202) and the host channel adapter (200). For example, a queue may be data provided by the host (202) for the host channel adapter (200) to send via the network. By way of another example, a queue may be data transmitted from the HCA (200) to the host (202) that was received from the network.

A queue (300) includes multiple entries. In one or more embodiments of the invention, each entry stores a single data packet or multiple data packets or portions thereof. Each queue (300) may be the same size. Alternately, queues (300) may vary in size depending on the use or expected traffic of the queue (300). Although the queues (300) may vary in size, the queues (300) are stored in memory (312) on frames of a fixed size. Additionally, the data allocated to a queue (300) may include additional space in memory that may be used in the event of the queue (300) running out of available entries.

Queues (300) are used to pass data between the host (202), which generates and uses the data, and the HCA (200), which sends and receives the data over the network. The HCA (200) and host (202) access the queue (300) using a hardware pointer (306) and a software pointer (308), respectively. In one or more embodiments of the invention, the pointers (306, 308) reference the queue entry in which data is being produced/consumed. In one or more embodiments of the invention, the queue(s) include one or more of the following: one or more completion queue(s) (300A), one or more receive queue(s) (300B), and one or more ring buffers (300C). The various types of queue (300) are explained in greater detail below. Although the term, "queue," is used through the description, the use of the term, "queue," denotes a conceptual structure rather than the actual layout of data from memory. Other data structures may be used without departing from the scope of the claims.

In one or more embodiments of the invention, queues (300) are divided into different categories based on their intended use. Completion queues (300A) are used to send and receive completions between the HCA (200) and the host (202). Specifically, a completion may indicate, for example, that a work request was performed, that data from the network is waiting for the host to process, or that a communication sent via the network was successfully received by the receiver of the communication. The data in the completion queue (i.e., a completion) is written to, or produced, into the completion queue by the HCA (200), and subsequently read, or consumed, from the completion queue (300A) by the host (202).

Receive queues (300B) are used to receive data sent over the network. In this case, the data on the receive queue (300B) is produced by the HCA (200) as it is received from the network, and consumed by the host (202). In one or more embodiments of the invention, for both the completion queue (300A) and the receive queue (300B), the data is produced/consumed one entry at a time.

In one or more embodiments of the invention, a ring buffer (300C) is a data structure composed of an array in memory (312). The array is indexed in such a way that when it is being accessed, the first entry in the array is immediately preceded by the last entry in the array. In other words the ring buffer (300C) is treated as an array of fixed size, but with no defined beginning and end. In one or more embodiments of the invention, the ring buffer (300C) includes the functionality to store data received from the network and data to send to the network. In one or more embodiments of the invention, the ring buffer (300C) may be accessed via the hardware (306) and software (308) pointers. Entries within the ring buffer (300C) may be simultaneously produced and consumed. The simultaneous production and consumption may be accomplished by reading the data in an entry, which then transforms the entry to an available entry which is available to be written. In one or more embodiments of the invention, more than one entry of the ring buffer (300C) may be produced and consumed at one time.

In one or more embodiments of the invention, a queue descriptor (302) is a data structure which stores information about the location, contents and utilization of a queue (300). Specifically, each queue may have a corresponding queue descriptor. Further, in one or more embodiments of the invention, each queue pair and queue has a corresponding queue descriptor. In one or more embodiments of the invention, the information is stored in fields. The format of the queue descriptor (302) may be identical for all instances, or it may vary depending on the specific details of the queue with which the queue descriptor is associated. Even if the format is consistent for individual queues, different data structures may be used for different types of queues. For example, a queue descriptor (302) for a completion queue (300A) and a queue descriptor (302) for a receive queue (300B) may have the same data arranged differently. Alternately, the information stored for different types of the queue descriptor (302) may vary as well. In one or more embodiments of the invention, the queue descriptor (302) may be dynamic, and able to adopt different formats to store the types of different data associated with different types of queues (300).

In one or more embodiments of the invention, multiple copies of a single queue descriptor (302) may be stored in multiple places. A copy of the queue descriptor (302) is in host memory (316) and a copy of the queue descriptor (302) may be kept in a queue descriptor cache (312). In one or more embodiments of the invention, the copy in the cache may be located in the descriptor fetch module (228) of the HCA (200). The host (202) may be configured to only access the copy of the queue descriptor (302) located in memory (316) and the HCA (200) may be configured to access only the copy of the queue descriptor (302) stored in queue descriptor cache (312). In one or more embodiments of the invention, the copy in memory (316) and the copy in the cache (312) may be accessed simultaneously by the host (202) and the HCA (200) resulting in the copies of the queue descriptor (302) having disparate contents. This disparity may be rectified by periodically re-fetching the queue descriptor (302) into the queue descriptor cache (312) from memory (316). In one or more embodiments of the invention, the queue descriptor cache (312) may be write-through. Specifically, any changes made to the queue descriptor (302) by the HCA (200) may be written directly into memory (316) as well. In one or more embodiments of the invention, the host (202) may also cache the queue descriptor (302) independently from the memory.

In one or more embodiments of the invention, the queue descriptor (302) includes one or more data fields (304), which store information describing the location and structure of the queue (300). The fields may include an address (304A, 304B) in memory at which the queue resides and a size (304B) of the queue. In one or more embodiments of the invention, a 'base address' field (304A) of the queue descriptor (302) stores the address of a block of memory in which the queue is stored and an 'address translation' field (304B) stores information detailing how the queue is indexed within said block. The queue size (304C) may be variable or fixed. Additionally, queues may be larger than the stored size, in order to provide emergency buffering. In one or more embodiments of the invention, even if queue size is variable, queues may still be stored on fixed frames for the purpose of indexing in memory. For example, if the address translation field (304B) indicates that a queue is indexed in the eighth spot (i.e., index number "7" starting from "0") on a memory page, and the size field (304C) indicates that queue entries occupy 2 k bytes, then the queue (300) associated with the queue descriptor (302) may be found at the base address (304A) plus the entry size multiplied by the index number. Thus, the queue would be at the base address plus 14 k.

In one or more embodiments of the invention, the queue descriptor (302) includes a data field which stores the current target of a hardware pointer (306) associated with the queue (300). The hardware pointer (306) is an address reference used by the HCA (200) to access the queue (300). In a receive queue (300B), the hardware pointer (306) is associated with data being consumed. In other words, the hardware pointer (306) references the entry in the queue that the hardware pointer (306) is reading. In a completion queue (300A) and ring buffer (300C), the hardware pointer (306) is associated with data being produced, or in other words, the hardware pointer (306) is the entry in the queue (300A, 300B) to which the HCA (200) is currently writing.

In one or more embodiments of the invention, the HCA (200) uses the copy of the hardware pointer in the copy of the queue descriptor that is cache (e.g., completion queue descriptor cache (312A), receive queue descriptor cache (312B), ring buffer queue descriptor cache (312C)) rather than the hardware pointer of the queue descriptor (302) in memory. Specifically, to identify the next location of the queue from which to produce or consume, the HCA (200) uses the hardware pointer in the cache rather than the hardware pointer in memory. Further, the HCA may increment the hardware pointer in the cache.

The value of the hardware pointer (306) may be incremented by the HCA (200) as it is used, or it may be set by the descriptor fetch module (228) in response to observed action by the HCA (200). In one or more embodiments of the invention, accesses by the HCA (200) only affect the cached copy of a queue descriptor (302). In such embodiments, the copy in the cache (312) may be periodically written to memory (316) in order to reflect changes in the cache. For example, in one or more embodiments in which the software depends on the hardware pointer being updated in memory, a same or similar threshold scheme as disclosed herein may be used to update the queue descriptor in memory based on the cache queue descriptor. Alternately, the queue descriptor (302) in memory (316) may be updated with each access to the queue by the HCA. Alternatively, the queue descriptor (302) in memory (316) may be updated only when the queue descriptor is evicted from the cache.

In one or more embodiments of the invention, the queue descriptor (302) includes a data field that stores the current target of a software pointer (308) associated with the queue (300). The software pointer (308) is a reference used by the host (202) to access the queue (300). As the queues (300) are a medium for passing data between the host (202) and the HCA (200), the software pointer (308) performs the opposite function of the hardware pointer (306) for a given queue (300). In a completion queue (300A) and ring buffer (300C), the software pointer (308) references an entry having data being consumed. In a receive queue (300B), the software pointer (308) references an entry having data being produced. In one or more embodiments of the invention, the host (202) uses the copy of the queue descriptor (300) stored in memory to access the queue (300).

In one or more embodiments of the invention, the software pointer (308) stored in the queue descriptor cache (312) is not accurate because the software pointer in the queue descriptor cache reflects the position of the software pointer (308) when the queue descriptor (300) was most recently fetched. The discrepancy between the values of the software pointer (308) in memory and of the software pointer (308) in the cache may result in the HCA (200) exhausting available entries in the queue (300) because the value of the software pointer in the cached copy of the queue descriptor (302) does not reflect the changes by the host after the cached copy was pre-fetched. When available entries are exhausted, delays in packet processing may result because the HCA (202) must wait for the current version of the queue descriptor (302) to be cached before the HCA can resume operation. In one or more embodiments of the invention, exhausting available entries may be alleviated or prevented periodically pre-fetching the queue descriptor (302) from memory (113) in anticipation of the exhaustion of available entries.

In one or more embodiments of the invention, the queue descriptor (302) includes a threshold (310). The threshold (310) is a numeric value representing a number of entries in the queue (300). In one or more embodiments of the invention, the threshold (310) represents the maximum number of available entries in the queue (300) needed to trigger a pre-fetch of the queue descriptor (302). In other words, once the number of available entries in the queue (302) has dropped below the number specified by the threshold (310), the version of the queue descriptor (302) stored in the memory (113) is reloaded into the cache (312). In one or more embodiments of the invention, the threshold (310) is set by the host (202). The threshold (310) may be set prior to the use of the queue (300). In one or more embodiments of the invention the threshold may be calculated based on an expected rate of traffic for the queue (300). The access latency of the memory (113) may also factor in to the calculation. In one or more embodiments of the invention, the threshold (310) is set to a number that ensures that the version of the queue descriptor (302) in the cache (312) always has an available entry for the HCA (200) to use. The method by which the threshold is set is detailed further in the description of FIG. 5 below.

In one or more embodiments of the invention, the queue descriptor (302) may be composed of two separate portions. A first portion may include the hardware pointer (306) and location and structured data fields (304). A second portion may include the software pointer (308) and threshold (310). In one or more embodiments of the invention, instead of pre-fetching the entire queue descriptor (302), only the second portion may be pre-fetched.

In one or more embodiments of the invention, the queues (300) and queue descriptors (302) are stored in main memory (316) of the host (202). The queue descriptors (302) are stored linearly in memory (113) and thus can be accessed simply by multiplying the queue number by the size of the queue descriptor (302) and adding it to a base address (different from the base address (304A)) of the block of memory in which the queue descriptors (302) are stored. The different types of queue descriptor (302) may be stored in different contiguous blocks of memory (113). Queues (302) may be, as previously stated, stored in multiple blocks of memory (113), and the location of a given queue (302) is described by an associated queue descriptor (302). The memory (113) may include one or more cache systems implemented and use independently of that of the descriptor fetch module (228). The HCA (200) or the host (202) may include functionality to use the cache systems. Cached systems may be implemented below a layer of abstraction, and consequently may have no effect on the operation, of the descriptor fetch module (228).

In one or more embodiments of the invention, the descriptor fetch module (228) is a component of the packet processing pipeline of the HCA (200) configured to obtain queue descriptors (302). In one or more embodiments of the invention, the descriptor fetch module (228) may include a queue descriptor cache (312) configured to store queue descriptors, a cache control module (314) including internal logic for managing the caches, functionality to communicate with additional modules within the HCA (200) as well as main memory (316) of the host (202). In one or more embodiments of the invention, the copy of queue descriptors may be stored in a single cache or multiple distinct caches.

In one or more embodiments of the invention, the descriptor fetch module (228) includes multiple queue descriptor caches (312). Specifically, a separate queue descriptor cache (312) may exist for each type of queue (300) present in the invention, including a completion queue descriptor cache (312A), a receive queue descriptor cache (312B). The descriptor fetch module (228) may include a ring buffer descriptor cache (312C) as well. In one or more embodiments of the invention, the HCA (200) uses additional types of queues (300), which may result in additional queue descriptor caches (312). The queue descriptor caches (312) may be addressed independently from memory (113). Alternatively, the queue descriptor caches may be addressed as an extension of memory (113). In one or more embodiments of the invention, the memory (113) is periodically updated or when cache eviction is performed to reflect the contents of the cache (312).

The queue descriptor caches (312) may by physically distinct, or may be partitions of a single physical cache (312). In one or more embodiments of the invention, the different caches (312) may be different sizes depending on the needs and constraints of the system. In one or more embodiments of the invention, the cache (312) may be accessed directly by modules of the HCA (200) that require access to a queue. Alternately, the cache (312) may only be accessed through the cache control module (314) (discussed below).

In one or more embodiments of the invention, the descriptor fetch module (228) includes a cache control module (314) including functionality to manage the queue descriptor caches (312). The cache control module (314) may include functionality to communicate with other modules in the HCA (200). Additionally, the cache control module (314) may include functionality to access the host (202) memory (113). In one or more embodiments of the invention, the cache control module (314) may retrieve queue descriptors (302) from the cache (312) and provide them to requesting modules. Alternately, the cache control module (314) may be configured to provide the location of the queue descriptor (302) within the cache (312).

The cache control module (314) may also include functionality to fetch and evict queue descriptors (302). In one or more embodiments of the invention, the cache control module (314) includes functionality to detect that the HCA (200) has accessed a queue (300). The cache control module (314) may then retrieve the queue descriptor (312) for the queue, and check the state of the queue (300) post-access against the threshold (308) for the queue (300). If number of available entries within the queue (300) is below the threshold (308), the cache control module (314) includes functionality to pre-fetch the queue descriptor (312). The cache control module (314) may calculate the number of available entries in the queue (300) by observing the difference between the hardware pointer (306) and the software pointer (308) in the queue descriptor (302). In one or more embodiments of the invention, the cache control module (314) may be include functionality to observe different factors that contribute to the calculation of the threshold (308), and to select one of multiple pre-set threshold (308) values to use based on the observed factors. The factors may include memory latency and rate of queue (300) consumption/production. In one or more embodiments of the invention, the system may forgo the threshold (308) altogether, and the cache control module (314) may initiate a pre-fetch based solely on observed factors. The cache control module (314) may also be configured to evict queue descriptors (302) from the queue descriptor cache (312). Many possible eviction algorithms may be used without departing from the scope of the invention.

In one or more embodiments of the invention, as discussed in FIG. 3 and above, the copy of the software pointer in the cache may not represent the actual position of the software pointer. Specifically, in one or more embodiments of the invention, after the copy of the queue descriptor is obtained from the cache, the software pointer in the cache specifies a static or set reference to the queue until the new copy of the queue descriptor is obtained. The hardware pointer, however, is updated.

When the hardware pointer references the same entry or an immediately preceding entry as the software pointer in the copy of the queue descriptor, the HCA cannot process more from the queue because the HCA does not know whether the entry referenced by the software pointer has changed. In such a scenario, the hardware pointer stalls in adding data to the queue or reading data from the queue until a new queue descriptor is obtained. In other words, the HCA must wait to identify the entry of the queue being referenced by the software pointer. One or more embodiments of the invention alleviate and/or prevent the hardware pointer from needing to stall by pre-fetching a new copy of the queue descriptor when the number of entries for the hardware to process in the queue is less than the threshold (e.g., the difference between the software pointer and the hardware pointer is less than the threshold). Specifically, the threshold is set such that the HCA does not stall because the hardware pointer references the same entry or immediately preceding entry as the software pointer before the new copy of the queue descriptor is cached. Further, in one or more embodiments of the invention, in the optimal threshold, the hardware pointer is just moved to reference an immediately preceding entry in the queue as the software pointer in the previous queue descriptor when the new copy of the queue descriptor is obtained. If the threshold is set such that the hardware pointer has too many entries, then the copy of the queue descriptor may be obtained from memory more frequently than required.

Figure 4:
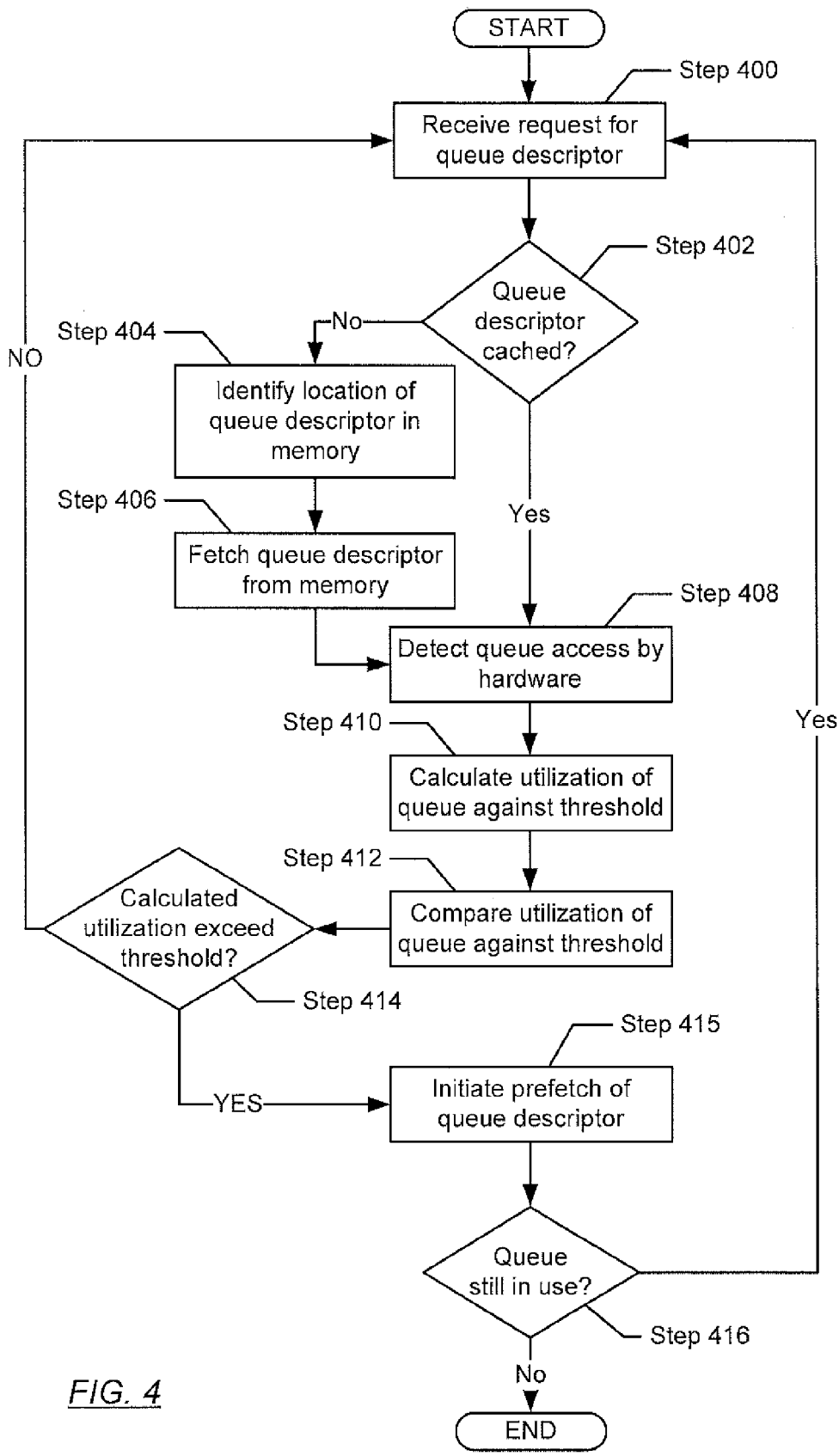
FIGS. 4-6 show flowcharts in one or more embodiments of the invention.
Figure 5:
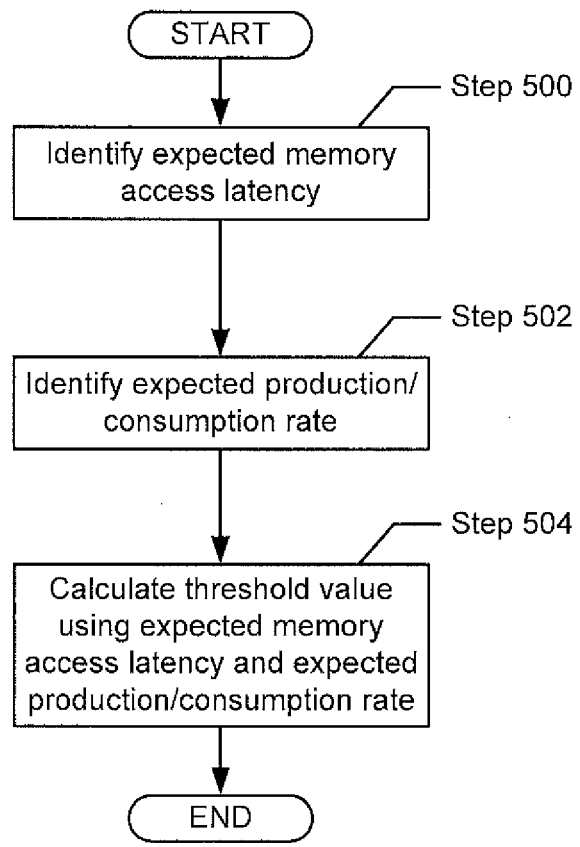
Figure 6:
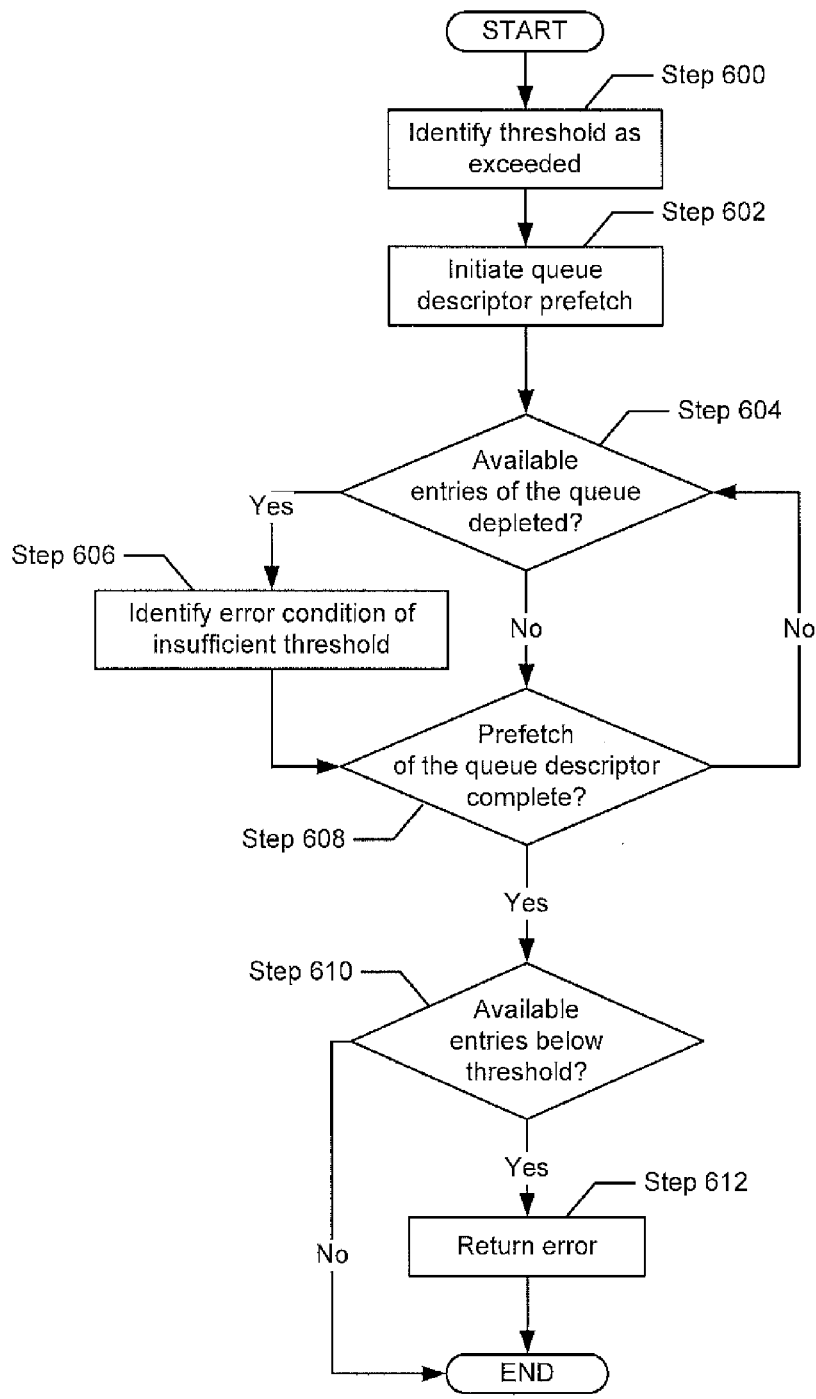

FIGS. 4-6 show flowcharts in one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention. Further, although FIGS. 4-6 show performing a sequence of determination steps in a particular order, two or more of the determination steps may be performed in parallel, in a different order, or omitted without departing from the scope of the claims.

FIG. 4 shows a flowchart for managing a queue descriptor cache in accordance with one embodiment of the invention. In Step 400, the descriptor fetch module receives a request for a queue descriptor. The request may be received from another module within the HCA. Alternately, the 'request' may be an anticipation of a need for the queue by the descriptor fetch module. For example, when a new work request is received by the HCA from the host or the network, the descriptor fetch module may receive a request for the queue descriptor corresponding to the QP specified in or by the work request.

In Step 402, a determination is made as to whether the queue descriptor is currently cached within the descriptor fetch module. In one or more embodiments of the invention, the cache control module may include an index which tracks cached queue descriptors. Accordingly, checking whether the queue descriptor is cached may include checking whether the cache control module indicates that the queue descriptor is cached. For example, the cache control module may include a content addressable memory (CAM) that associates QP with a location of a cached copy of the queue descriptor.

In Step 404, if the queue descriptor is not currently located in the queue descriptor cache, the descriptor fetch module determines the location of the queue descriptor in memory. In one or more embodiments of the invention, the queue descriptors are stored linearly in memory. In such a scenario, the location of the queue descriptor may be obtained by using the queue number, the size of the frame in which queues are stored, and a base address of the block of memory in which the queue descriptors are stored. The different types of queue descriptors may be stored in separate blocks, or may be stored intermixed within a single continuous block of memory. In one or more embodiments of the invention, determining the location of a queue descriptor may be performed by querying an address table to obtain the address of the queue descriptor.

In Step 406, the descriptor fetch module fetches the queue descriptor from memory. Fetching may include reading the queue descriptor from memory and writing a copy of the queue descriptor into the appropriate cache. If the queue descriptor being fetched is not currently in the cache, a cached queue descriptor may need to be evicted. In one or more embodiments of the invention, the queue descriptor to evict is based on a least recently used algorithm. Alternatively, a certain entry in the cache may be associated with a certain section of memory, and any queue descriptor in that section is written to the certain entry. Many possible caching algorithms may be used without departing from the scope of the invention.

In Step 408, access to the queue is detected in one or more embodiments of the invention. In one or more embodiments of the invention, the descriptor fetch module may detect access by the cache control module observing an access to the queue descriptor associated with the queue. Alternatively or additionally, the descriptor fetch module may receive a notification from one of the other modules that the queue has received traffic. Alternatively or additionally, rather than directly detecting access to the queue, an update of the hardware pointer may be detected. For example, the descriptor fetch module may detect that another module has requested a change in the hardware pointer.

In Step 410, utilization of the queue is calculated against a threshold. For example, the utilization of the queue may be calculated by calculating the difference between the hardware pointer and software pointer, both stored in the cached queue descriptor. If the queue is a completion queue or ring buffer, then the utilization of the queue represents the number of remaining entries in the queue which are available for the HCA to store data. If the queue is a receive queue, then the utilization represents the number of remaining occupied entries in the queue to be consumed. In other words, the utilization represents, for the receive queue, the number of entries that the HCA can read.

In Step 412, the measured utilization of the queue is compared against the threshold. In Step 414, a determination is made whether the calculated utilization exceeds the threshold. Different techniques may be used to define whether the threshold is exceeded. For example, if the threshold identifies a maximum number of used entries, then the determination may be whether the utilization value that represents the number of used entries is greater than the threshold. If the threshold identifies the minimum number of available entries, then the determination may be made whether the utilization value that represents the number of available entries is less than the threshold. As shown, different mechanisms may be used when defining the utilization level and threshold. For example, the threshold may be set such that the threshold is exceeded when the utilization level is less than, less than or equal to, greater than or equal to, or greater than the threshold.

If the threshold is not exceeded, then the method may repeat with Step 400. In other words, the copy of the queue descriptor may remain in the cache without fetching a new copy and may be used to process new requests for the queue descriptor. Rather than returning to Step 400, the method may proceed with Step 408 without departing from the scope of the invention.

Alternatively, if the threshold is exceeded, a pre-fetch of queue descriptor from memory is initiated in Step 415. The pre-fetch may be timed such that the HCA does not exhaust the supply of available entries before the pre-fetch has been performed. In one or more embodiments of the invention, the timing is set based on the threshold.

In Step 416, a determination is made as to whether the queue is still required by the HCA. Determining whether the queue descriptor is still required may be based on data in the copy of the queue descriptor. For example, the data may indicate the last time the queue descriptor was accessed, a reference count for the queue descriptor, or any other information. If the queue is not required, then the queue descriptor may be marked for eviction by the cache control module. Based on being marked for eviction, the copy of the queue descriptor may be replaced with another queue descriptor. Replacing the copy of the queue descriptor may include writing any changes back to memory in one or more embodiments of the invention.

FIG. 5 shows a flowchart for setting the queue descriptor threshold in accordance with one embodiment of the invention. The queue descriptor threshold may be set by the host in anticipation of certain needs and limitations of the system.

In Step 500, an expected access latency of the memory is determined. The latency may be predetermined based on historical performance of memory and communication between the HCA and memory. In one or more embodiments of the invention, the latency may also reflect the expect volume of memory access requests, the available caching resources, and the limitations of the physical hardware. In one or more embodiments of the invention, the expected latency variable is calculated, and the threshold is set, by the host. Alternatively, the access latency variable used in threshold calculations may be adjusted or reset by the cache control module in response to observed performance of the system.

In Step 502, the expected production/consumption rate of the queue by the HCA is determined. The production/consumption rate is a measure of the rate at which the HCA reads data from entries of a completion queue, or writes data to entries of a production queue. The production/consumption rate may calculated from expected traffic of the application using the queue, the volume of additional traffic on the network, the transmission rate of the network, the priority of the queue, and/or other factors. In one or more embodiments of the invention, the rate of queue usage is calculated, and the threshold is set, by the host. Alternately, the rate of queue usage in threshold calculations may be adjusted or reset by the cache control module in response to observed performance of the system.

In Step 504, the value of the threshold is calculated using the expected memory access latency and the expected production/consumption rate. In one or more embodiments of the invention, the threshold may be calculated by multiplying the memory access latency by the expected production/consumption rate by the HCA. In one or more embodiments of the invention, the threshold may be padded to account for variations in the aforementioned metrics. In one or more embodiments of the invention, the calculation of the threshold may be done by the cache control module using values for the metrics observed during the use of the queue.

In one or more embodiments of the invention, a number of different threshold values may be calculated and stored. For example, a selection of different possible threshold values, which each correspond to different observed rates of production/consumption and/or a number of sets of observed performance conditions, may exist.

The different possible thresholds may be in the queue descriptor. Alternatively, a single threshold value may be selected from a preexisting list based on the calculations and stored in the queue descriptor. Based on the observed metrics and calculation, the cache control module may include functionality to select a value for the threshold from the list, calculate a new value for the threshold, or forgo the threshold and independently determine when to pre-fetch the queue descriptor.

Rather than the cache control module selecting or calculating the threshold, the values from the observed performance of the system, as well as notifications and errors may be reported back to the host. In response, the host may adjust the threshold within the queue descriptor in memory, and the cached queue descriptor is updated during pre-fetching.

FIG. 6 shows a flowchart for handling various errors during the queue descriptor cache management. In Step 600, the threshold is identified by the cache control module as having been exceeded. Step 600 may be performed the same or similar to Step 414 of FIG. 4, described above.

In Step 602, the process of retrieving a current copy of the queue descriptor from memory is initiated. The process of fetching the queue descriptor from memory may be performed as discussed above an in FIG. 4.

In Step 604, a determination is made as to whether the available entries indicated by the queue descriptor in the cache are depleted. Specifically, an HCA module may attempt to obtain the next available entry based on the position of the software and hardware pointer. In Step 606, if the queue has no remaining entries for the HCA to use, and the pre-fetch has not completed, then an error condition of an insufficient threshold is identified. Specifically, the current threshold may be set too low. Because additional incoming packets may not be stored, any new packets may be dropped or returned to the sender until space on the queue is available. Further, in one or more embodiments of the invention, the host may be notified that the current threshold is insufficient. In one or more embodiments of invention, the returned packets are marked to indicate that this is the reason that the packets were returned.

In Step 608, a determination is made as to whether the pre-fetch has been completed. This may be determined by the cache control module after a new copy of the queue descriptor is written into the cache. If the pre-fetch is not complete, accesses by the HCA will continue to be handled until the depletion of the available entries in Step 604.

In Step 610, after the pre-fetch has completed, a determination is made as to whether the threshold of the current queue descriptor is still greater than the available number of entries in the queue. Specifically, immediately after a new copy of the queue descriptor is obtained and prior to use of the new copy by the HCA, the HCA may determine whether the number of available entries is below the threshold.

If the number of available entries indicated by the current copy of the queue descriptor is below the threshold, an imbalance may exist between the rate that the HCA is using entries in the queue, and the rate that the host is using entries. In such a scenario, in Step 612, an error is returned. Specifically, an error message or warning may be sent to the host indicating that an imbalance may exist. The HCA may continue to attempt to function as normal, or it may alter attempts to pre-fetch until the issue has been rectified.

Figure 7:
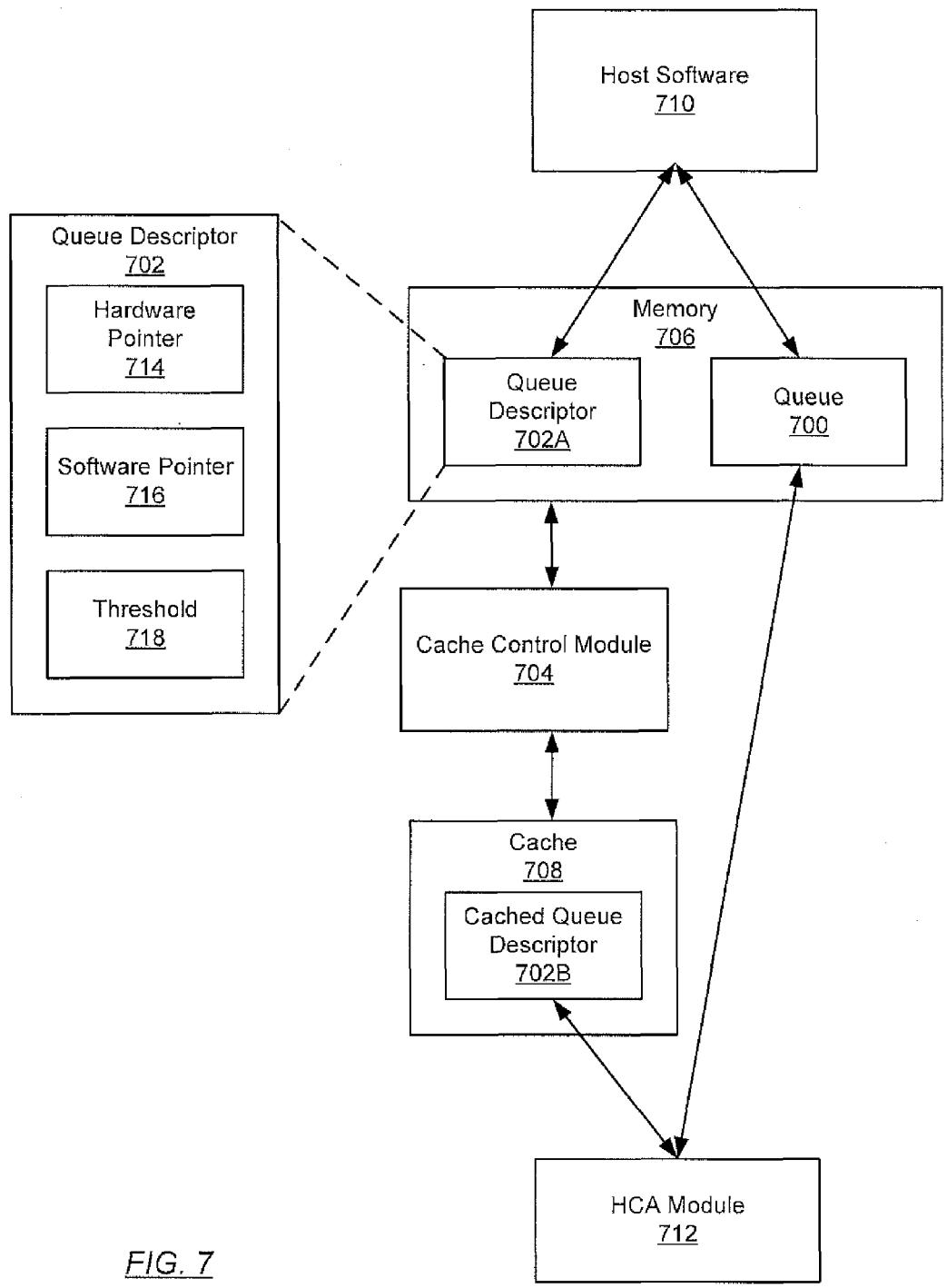
FIG. 7 shows an example in one or more embodiments of the invention.

FIG. 7 shows an example of the queue descriptor cache system being utilized in accordance with one embodiment of the invention.

The HCA is expecting incoming traffic on a receive queue (700). The cache control module (704) determines if a copy of the receive queue descriptor (702B) is currently stored in the receive queue descriptor cache (708). If there is a copy of the queue descriptor (702B) present, then the cache control module (704) may verify that the copy (702B) is current. If the queue descriptor (702A) is not presently cached, then the cache control module (704) identifies the location of the queue descriptor (702A) in memory (706). For the example purposes, consider the scenario in which all of the receive queue descriptors are stored linearly in a block of memory (706) according to queue number. Thus, the appropriate queue descriptor (702A) is located at a position corresponding to the queue number within the block of memory (706). For example, if queue numbers 12-23 are receive queues, the required queue (700) is queue number 15, queue descriptors are stored on 32 byte frames, and the base address of the block of memory (700) in which receive queues are stored is 0x1000, then queue descriptor (702A) will be located at address 0x1060 (0x1000+(0xF−0xC)*0x20).

In order to bring the queue descriptor (702A) into the cache (708), the cache control module (704) must evict a queue descriptor currently located in the cache (708). An eviction victim of a queue descriptor is selected from the cache (708) based on a chosen cache eviction algorithm and a copy of the queue descriptor (702B) is stored in its place. The address of the cached queue descriptor (702B) within the cache (708) is given to the HCA module (712).

The cache control module (704) detects an access to the cached queue descriptor (702B) by the HCA module (712). The access is to update the hardware pointer (714) of the queue descriptor (702B). In response to the access, the cache control module (704) checks the utilization of the queue (700) by calculating the difference between the hardware pointer (714) and the software pointer (712) which indicates the number of guaranteed available entries in the queue (700). Because the queue descriptor (702) is a receive queue descriptor, the hardware pointer (714) is consuming entries and the software pointer (716) is producing them. Thus, the available entries are those entries, which the contents have been written by the host software (710) and, thus, are to be read by the HCA module (712). The calculated number of available entries is then compared against the threshold (718) stored in the cached queue descriptor (702B).

The threshold (718) indicates the minimum number of available entries shown by the cached queue descriptor (702B) before a new copy of the queue descriptor (702A) should be fetched from memory (700) such that the HCA (712) does not wait for the fetch to complete in order to access the queue (700). In the example, consider the scenario in which the threshold (718) is 10 entries. In such a scenario, if the software pointer (716) of the cached queue descriptor (702B) references the 13$^{th}$ entry in the queue, and after the initial access the hardware pointer (714) references the 2$^{nd}$ entry, then 11 entries are available entries. Because the number of available entries has not yet reached minimum indicated by the threshold (718), and the cache control module (704) takes no action.

The cache control module (704) checks the number of available entries every time an access to the cached queue descriptor (702B) is made by the HCA (712). Thus after a second access by the HCA (712) the cache control module (704) again determines that there are 10 available entries and determines that the threshold (718) has been reached. The threshold (718) being reached triggers a pre-fetch of the queue descriptor (702) from memory (706). Because the threshold (718) was calculated to be the ideal number of entries based on the expected rate of production by the HCA (712) and the expected access latency of the memory (706), the pre-fetch completes before the last of the available entries of the queue (700) is written by the HCA (712) without requiring more pre-fetches than necessary. When the pre-fetch is complete, the new copy of the queue descriptor (702B) includes a more recent software pointer (716), which, in turn, extends the number of available entries beyond the threshold (700) again.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for managing a queue descriptor cache of a host channel adaptor (HCA), comprising:
    obtaining a queue descriptor from memory, wherein the queue descriptor comprises a plurality of data describing a queue and wherein the memory is located in a host system;
    storing a copy of the queue descriptor in the queue descriptor cache of the HCA;
    accessing, by the HCA, the copy of the queue descriptor to obtain the plurality of data;
    accessing, by the HCA and using the plurality of data, the queue;
    updating, by the HCA, the plurality of data to reflect the access to the queue;
    calculating, using the plurality of data, a value corresponding to utilization of the queue;
    comparing the value against a threshold;
    fetching, if the value exceeds the threshold, a new copy of the queue descriptor from memory; and
    replacing the copy of the queue descriptor in the queue descriptor cache with the new copy obtained from the memory.

2. The method of claim 1,
    wherein the queue comprises a plurality of entries,
    wherein the plurality of data comprises the threshold, a software pointer, and a hardware pointer,
    wherein the software pointer references a queue entry most recently accessed by the host system,
    wherein the hardware pointer references a queue entry most recently accessed by the HCA, and
    wherein the value corresponding to utilization of the queue represents a number of entries separating the software pointer and the hardware pointer.

3. The method of claim 2, wherein the software pointer in the queue descriptor in memory is updated after the host system accesses to the queue without updating the software pointer in the copy of the queue descriptor, and wherein the new copy of the queue descriptor comprises an updated software pointer.

4. The method of claim 3,
    wherein the queue descriptor comprises a first portion and a second portion,
    wherein the first portion comprises the hardware pointer,
    wherein the second portion comprises the software pointer, and
    wherein fetching the new copy of the queue descriptor comprises obtaining only the second portion of the queue descriptor from memory.

5. The method of claim 3, wherein the threshold represents an expected number of entries in the queue accessed by the HCA in an expected time required to fetch the new copy of the queue descriptor from memory.

6. The method of claim 5, further comprising:
    identifying, by the host, an expected memory access latency of the HCA;
    identifying, by the host, an expected queue access rate of the HCA;
    multiplying, by the host, the expected memory access latency with the expected queue access rate to obtain the threshold; and
    setting, by the host, the threshold within the queue descriptor.

7. The method of claim 2,
    wherein the queue is one of a plurality of queues,
    wherein the plurality of queues comprises:
        a completion queue, configured to store completions;
        a receive queue, configured to store references to data buffers in the memory;
        a ring buffer, configured to store received data packets,
    wherein the HCA is configured to read from the receive queue, and write to the completion queue and the ring buffer, and
    wherein the host is configured to write to the receive queue, and read from the completion queue and the ring buffer.

8. The method of claim 5,
    wherein the queue descriptor comprises a plurality of potential thresholds,
    wherein each of the plurality of potential thresholds is associated with at least one selected from a group consisting of a different expected memory access latency and a different expected rate of queue consumption, and
    wherein at least one of the plurality of potential thresholds is selected to be used as the threshold based on an observed memory access latency and an observed queue access rate.

9. A host channel adaptor (HCA), comprising:
descriptor fetch circuitry, comprising:
a queue descriptor cache, configured to store a copy of a queue descriptor comprising a plurality of data describing a queue,
wherein the queue descriptor is located in a memory of a host operatively connected to the HCA, and
wherein the queue is located in the memory and comprises a plurality of entries; and
cache control circuitry, configured to:
obtain the copy of the queue descriptor from the memory,
store the copy of the queue descriptor in the cache,
determine that the HCA has accessed the queue,
calculate a value representing a utilization of the queue,
compare the value against a threshold, and
fetch a new copy of the queue descriptor from memory when the value exceeds the threshold; and
a plurality of additional circuitry, configured to:
access the copy of the queue descriptor to obtain the plurality of data;
access, using the plurality of data, the queue; and
update the plurality of data to reflect the access to the queue.

10. The method of claim 9,
wherein the plurality of data comprises the threshold, a software pointer, and a hardware pointer,
wherein the software pointer references a queue entry most recently accessed by the host system,
wherein the hardware pointer references a queue entry most recently accessed by the HCA, and
wherein the value corresponding to the utilization of the queue represents a number of entries separating the software pointer and the hardware pointer.

11. The HCA of claim 10, wherein the threshold represents an expected number of entries in the queue accessed by the HCA in an expected time required to fetch the new copy of the queue descriptor from memory.

12. The HCA of claim 10,
wherein the queue descriptor comprises a first portion and a second portion,
wherein the first portion comprises the hardware pointer,
wherein the second portion comprises the software pointer, and
wherein the descriptor fetch circuitry is further configured to obtain only the new copy of the second portion of the queue descriptor from memory, and store the new copy in place of the second portion of the copy of the queue descriptor in the cache.

13. The HCA of claim 12,
wherein the queue descriptor comprises a plurality of potential thresholds,
wherein each of the plurality of potential thresholds is associated with at least one selected from a group consisting of a different expected memory access latency and a different expected rate of queue consumption, and
wherein one of the potential thresholds is selected to be used as the threshold based on an observed memory access latency and an observed queue access rate.

14. The HCA of claim 9, wherein the HCA is configured to send and receive packets over a channel-based switched fabric network.

15. A system comprising:
a host, comprising:
a processor, and
a memory configured to store:
a queue descriptor comprising a plurality of data describing a queue, comprising:
a hardware pointer configured to reference an entry in the queue most recently access by the HCA,
a software pointer configured to reference an entry in the queue most recently accessed by a host, and
a threshold; and
a queue comprising a plurality of entries; and
a host channel adapter (HCA) operatively connected to the host and comprising:
a cache configured to store a copy of the queue descriptor, and
cache control circuitry, configured to:
obtain the copy of the queue descriptor from the memory;
store the copy of the queue descriptor in the cache;
determine that the HCA has accessed the queue;
calculate a value representing the number of entries separating the software pointer and the hardware pointer;
compare the value against the threshold; and
fetch a new copy of the queue descriptor from the memory when the value exceeds the threshold; and
a plurality of additional circuitry, configured to:
access the copy of the queue descriptor to obtain the plurality of data;
access, using the plurality of data, the queue; and
update the plurality of data to reflect the access to the queue.

16. The system of claim 15, wherein the host is configured to update the software pointer of the queue descriptor located in memory after accessing the queue, and without the copy of the queue descriptor in the cache being changed.

17. The system of claim 15, wherein the host is configured to:
identify an expected memory access latency of the HCA;
identify an expected queue access rate of the HCA;
multiply the expected memory access latency with the expected queue access rate to obtain the threshold; and
set the threshold within the queue descriptor.

18. The system of claim 15,
wherein the queue is one of a plurality of queues stored in the memory,
wherein the plurality of queues comprises:
a completion queue, configured to store completions;
a receive queue, configured to store references to data buffers in the memory;
a ring buffer, configured to store received data packets,
wherein the HCA is configured to read from the receive queue, and write to the completion queue and the ring buffer, and
wherein the host is configured to write to the receive queue, and read from the completion queue and the ring buffer.

19. The system of claim 18, wherein the HCA comprises a plurality of queue descriptor caches comprising:
a completion queue descriptor cache stores a queue descriptor describing the completion queue;
a receive queue descriptor cache, configured to store a queue descriptor describing the receive queue; and
a ring buffer descriptor cache, configured to store a queue descriptor describing the ring buffer.

20. The system of claim 15, wherein the host system is configured to use the HCA to communicate over a channel-based switched fabric network.

* * * * *